(12) United States Patent
Shen et al.

(10) Patent No.: US 11,001,217 B2
(45) Date of Patent: May 11, 2021

(54) VEHICLE AIRBAG ASSEMBLY

(71) Applicant: Ford Global Technologies, LLC, Dearborn, MI (US)

(72) Inventors: Ming Shen, Royal Oak, MI (US); Raed Essa El-Jawahri, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 111 days.

(21) Appl. No.: 16/372,733

(22) Filed: Apr. 2, 2019

(65) Prior Publication Data

US 2020/0317153 A1 Oct. 8, 2020

(51) Int. Cl.
| | | |
|---|---|---|
| *B60R 21/205* | (2011.01) | |
| *B60R 21/2338* | (2011.01) | |
| *B60R 21/239* | (2006.01) | |
| *B60R 21/26* | (2011.01) | |
| *B60R 21/216* | (2011.01) | |

(52) U.S. Cl.
CPC .......... *B60R 21/205* (2013.01); *B60R 21/239* (2013.01); *B60R 21/2338* (2013.01); *B60R 21/26* (2013.01); *B60R 2021/2161* (2013.01); *B60R 2021/23382* (2013.01); *B60R 2021/26058* (2013.01)

(58) Field of Classification Search
CPC ... B60R 21/205; B60R 21/26; B60R 21/2338; B60R 21/239; B60R 2021/26058; B60R 21/20; B62D 25/145; B62D 25/14
See application file for complete search history.

(56) References Cited

U.S. PATENT DOCUMENTS

| | | | |
|---|---|---|---|
| 3,514,124 A | | 5/1970 | Richardson |
| 3,951,427 A | | 4/1976 | Wilfert |
| 5,074,583 A | * | 12/1991 | Fujita ................. B60R 21/01536 280/730.1 |
| 5,255,937 A | * | 10/1993 | EmamBakhsh ..... B60R 21/2171 280/728.1 |
| 5,474,323 A | | 12/1995 | Davidson |
| 6,109,649 A | * | 8/2000 | Adomeit ................. B60R 21/20 280/740 |
| 6,712,385 B2 | | 3/2004 | Enders |
| 7,328,913 B2 | | 2/2008 | Song et al. |
| 9,150,180 B1 | | 10/2015 | Faruque et al. |
| 9,771,743 B2 | | 9/2017 | Roychoudhury et al. |
| 2004/0100080 A1 | * | 5/2004 | DePue .................. B60R 21/231 280/743.1 |
| 2007/0210616 A1 | * | 9/2007 | Wenzel ................. B29C 45/006 296/187.03 |
| 2009/0127833 A1 | * | 5/2009 | Rick ..................... B60R 21/205 280/728.2 |
| 2010/0109365 A1 | * | 5/2010 | Shibata ................. B60R 21/206 296/37.12 |

(Continued)

*Primary Examiner* — James A English
*Assistant Examiner* — Kurtis Nielson
(74) *Attorney, Agent, or Firm* — Frank A. MacKenzie; Bejin Bieneman PLC

(57) ABSTRACT

An assembly includes a front console having an outer surface and a pair of outboard ends spaced along an axis and defining a center therebetween. The assembly includes an airbag supported by the front console at one of the outboard ends and inflatable from an uninflated position elongated transverse to the axis to an inflated position extending along the outer surface toward the center.

20 Claims, 5 Drawing Sheets

(56) References Cited

U.S. PATENT DOCUMENTS

| | | | | |
|---|---|---|---|---|
| 2011/0101652 A1* | 5/2011 | Abe | ................... | B60R 21/239 |
| | | | | 280/728.3 |
| 2012/0025497 A1* | 2/2012 | Yoo | ................... | B60R 21/233 |
| | | | | 280/729 |
| 2012/0038181 A1* | 2/2012 | Yamazaki | ............ | B62D 25/145 |
| | | | | 296/72 |
| 2013/0001937 A1* | 1/2013 | Yamada | ............... | B60R 21/205 |
| | | | | 280/732 |
| 2014/0001792 A1* | 1/2014 | Aoki | ................... | B62D 25/145 |
| | | | | 296/193.09 |
| 2015/0343986 A1* | 12/2015 | Schneider | ............ | B60R 21/205 |
| | | | | 280/729 |
| 2019/0111880 A1* | 4/2019 | Choi | ................... | B60R 21/2338 |
| 2019/0126883 A1* | 5/2019 | Yamazaki | ............. | B60R 21/231 |
| 2019/0256035 A1* | 8/2019 | Hioda | ................... | B60R 21/215 |
| 2019/0299901 A1* | 10/2019 | Nakamura | ......... | B62D 25/2018 |
| 2019/0322238 A1* | 10/2019 | Gould | ................... | B60R 21/235 |
| 2020/0130634 A1* | 4/2020 | Rutgersson | ......... | B60R 21/2342 |

\* cited by examiner

VEHICLE AIRBAG ASSEMBLY

BACKGROUND

A vehicle may include one or more airbags deployable during a vehicle impact to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

Figure 1:
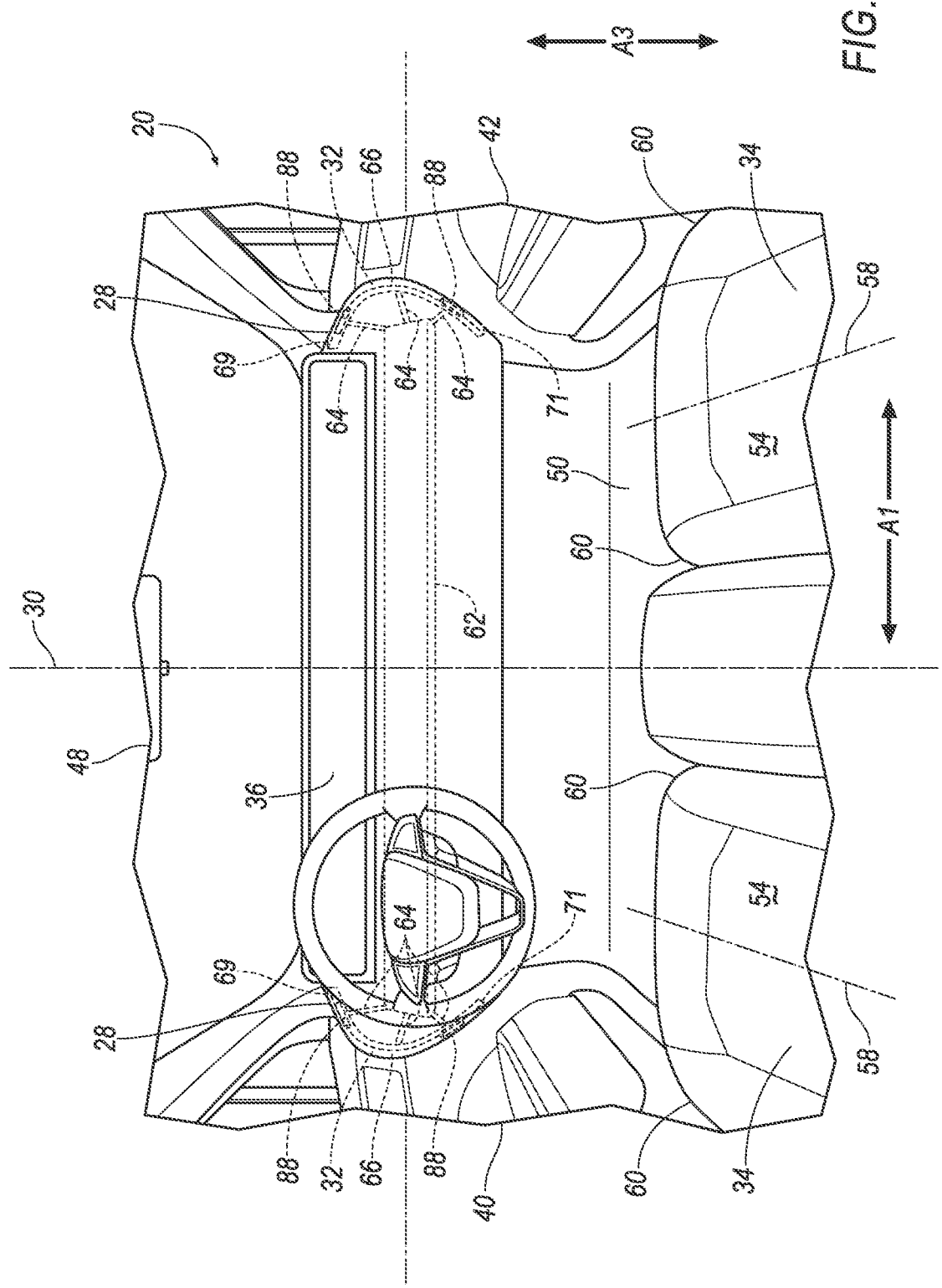
FIG. 1 is a perspective view of a vehicle including an airbag assembly.

An assembly includes a front console having an outer surface and a pair of outboard ends spaced along an axis and defining a center therebetween. The assembly includes an airbag supported by the front console at one of the outboard ends and inflatable from an uninflated position elongated transverse to the axis to an inflated position extending along the outer surface toward the center.

The assembly may include a housing supported by the front console at one of the outboard ends, the housing supporting the airbag.

The housing may be elongated transverse to the axis.

The front console may include a plurality of support arms fixed to the housing.

The assembly may include a first inflator in fluid communication with the airbag, and a second inflator in fluid communication with the airbag.

The airbag in the uninflated position may be elongated between a first end and a second end, the first inflator at the first end and the second inflator at the second end.

The assembly may include a seat having a seatback, the airbag in the inflated position abutting the seatback.

The seatback may include a rear surface, the airbag in the inflated position abutting the rear surface.

The airbag in the inflated position may include a top panel and a bottom panel, the top panel extending away from the front console perpendicular to the axis further than the bottom panel.

The outer surface of the front console may be a class-A surface, and the airbag in the inflated position may include a panel that abuts the class-A surface.

The outer surface may define a curved profile transverse to the axis, and the airbag in the inflated position may include a panel that defines a profile that conforms to the curved profile.

The assembly may include a user interface supported by the front console, the airbag in the uninflated position is outboard of the user interface.

The assembly may include a seat, the user interface facing the seat, and the airbag in the inflated position abutting the user interface.

The assembly may include a first seat and a second seat spaced along the axis, and a user interface extending along the front console in front of the first seat and the second seat.

The airbag in the inflated position may include a plurality of tethers spaced along the axis.

The airbag in the inflated position may include a second plurality of tethers spaced along the axis and below the plurality of tethers.

The assembly may include a first inflator and a second inflator, the plurality of tethers between the first inflator and the second inflator.

The airbag in the inflated position may include a pair of panels spaced along the axis, each panel including a vent.

The airbag in the inflated position may include a panel spaced from the front console and that curves away from the front console.

The airbag in the uninflated position may be curved.

With reference to the Figures, wherein like numerals indicate like parts throughout the several views, an airbag assembly 20 for a vehicle 22 includes a front console 24 having an outer surface 26 and a pair of outboard ends 28 spaced along an axis A1, such as a cross-vehicle axis A1, and defining a center 30 therebetween. The airbag assembly 20 includes an airbag 32 supported by the front console 24 at one of the outboard ends 28 and inflatable from an uninflated position elongated transverse to the axis A1 to an inflated position extending along the outer surface 26 toward the center 30.

The airbag assembly 20 provides control of kinematics of an occupant of a seat 34 of the vehicle 22, e.g., the airbag 32 in the inflated position is between the seat 34 and the front console 24. Supporting the airbag 32 at one of the outboard ends 28 enables the front console 24 to support a user interface 36, or other structure, at a location on the front console 24 traditionally used to support an airbag in an uninflated position, e.g., centered in front 44 of the seat 34.

The vehicle 22 may be any type of passenger or commercial automobile such as a car, a truck, a sport utility vehicle, a crossover vehicle, a van, a minivan, a taxi, a bus, etc.

The vehicle 22 may operate in an autonomous mode, a semiautonomous mode, or a nonautonomous mode. For purposes of this disclosure, an autonomous mode is defined as one in which each of vehicle propulsion, braking, and steering are controlled by a computer 38; in a semiautonomous mode the computer 38 controls one or two of vehicles propulsion, braking, and steering; in a nonautonomous mode, a human operator controls the vehicle propulsion, braking, and steering.

The vehicle 22 defines the cross-vehicle axis A1, i.e., extending between a left side 40 and a right side 42 of the vehicle 22. The vehicle 22 defines a vehicle-longitudinal axis A2, i.e., extending between a front 44 and a rear 46 of the vehicle 22. The vehicle 22 defines a vehicle-vertical axis A3, i.e., extending between a top 48 and a bottom 50 of the vehicle 22. The vehicle-longitudinal axis A2, the cross-vehicle axis A1, and the vehicle-vertical axis A3 are perpendicular to each other. The top 48, bottom 50, front 44, rear 46, and left side 40 and right side 42 may be relative to an orientation of an occupant of the vehicle 22. The top 48, bottom 50, front 44, rear 46, and left side 40 and right side 42 may be relative to an orientation of controls for operating the vehicle 22, e.g., the front console 24. The top 48, bottom 50, front 44, rear 46, and left side 40 and right side 42 may be relative to a driving direction of the vehicle 22 when wheels of the vehicle 22 are all parallel with each other.

The vehicle 22 includes a passenger cabin. The passenger cabin includes one or more seats 34. The seats 34 are shown as bucket seats, but the seats 34 may be other types. Each seat 34 may include a seatback 52, a seat bottom 54, and a head restraint. The head restraint may be supported by the seatback 52 and may be stationary or movable relative to the seatback 52. The seatback 52 includes a rear surface 56. The rear surface 56 faces away from, i.e., is opposite, the seat bottom 54. The seatback 52 may be supported by the seat bottom 54 and may be stationary or movable relative to the seat bottom 54. The seatback 52, the seat bottom 54, and/or the head restraint may be adjustable in multiple degrees of freedom. Specifically, the seatback 52, the seat bottom 54, and/or the head restraint may themselves be adjustable, in other words, adjustable components within the seatback 52, the seat bottom 54, and/or the head restraint, and/or may be adjustable relative to each other.

Each seat 34 may be supported by a floor of the vehicle 22. Each seat 34 may be rotatable relative to the floor. For example, each seat 34 may be supported by a pivotable base fixed to the floor. Each seat 34 may pivot along an axis that is parallel to the vehicle-vertical axis A3, e.g., enabling an occupant of such seat 34 to pivot the seat 34 to face the front 44, the rear 46, the right side 42, or the left side 40 of the vehicle 22. The seats 34 may be spaced along the cross-vehicle axis A1, e.g., one seat 34 at the right side 42 of the vehicle 22, and another seat 34 at the left side 40 of the vehicle 22. Each seat 34 may define a center 58, i.e., equidistance between sides 60 of the seat 34 relative to the cross-vehicle axis A1 and when the seat 34 is facing the front console 24.

Figure 4:
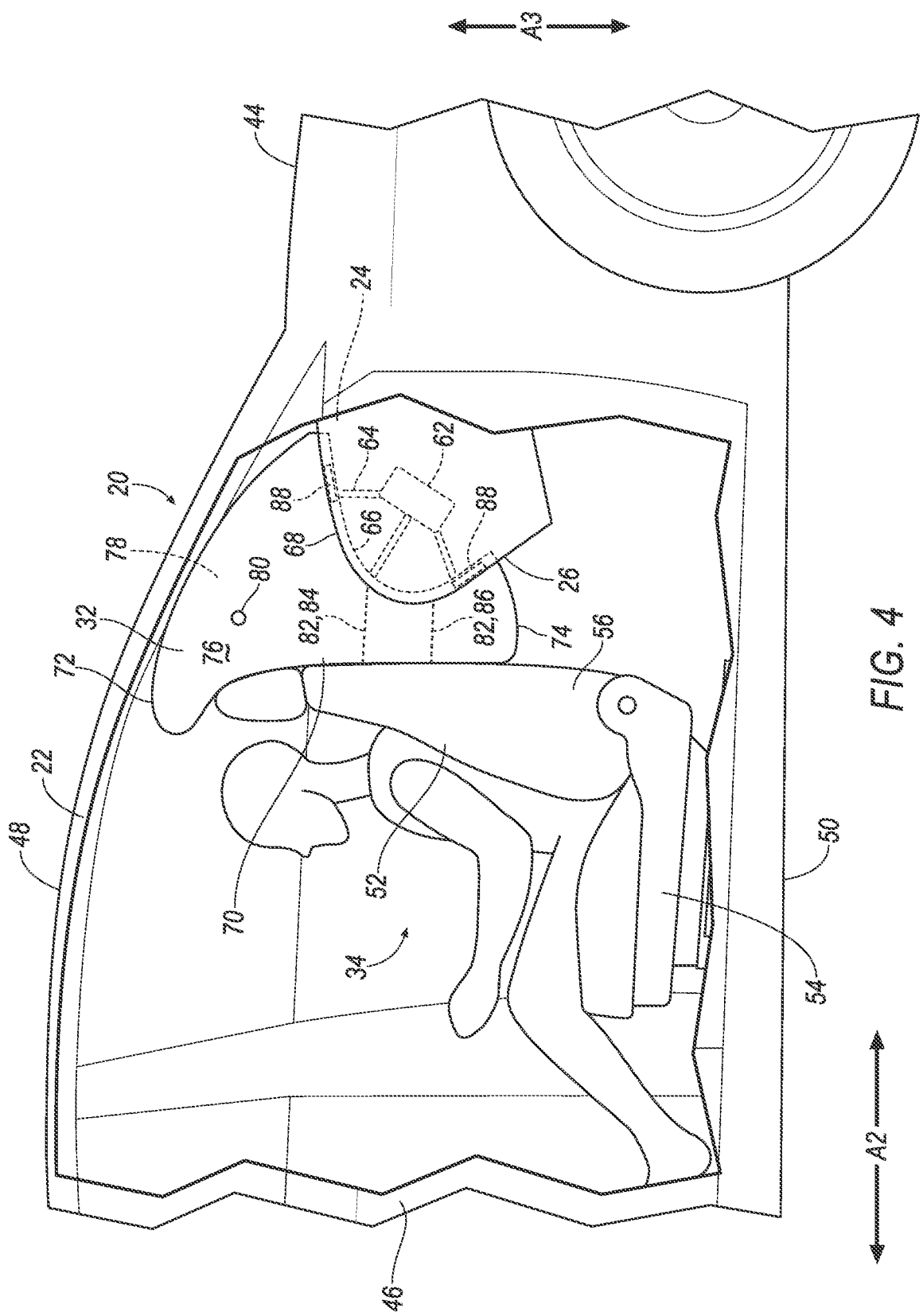
FIG. 4 is a side view of the vehicle including the airbag assembly and having the inflated airbag and a rear facing seat.
Figure 5:
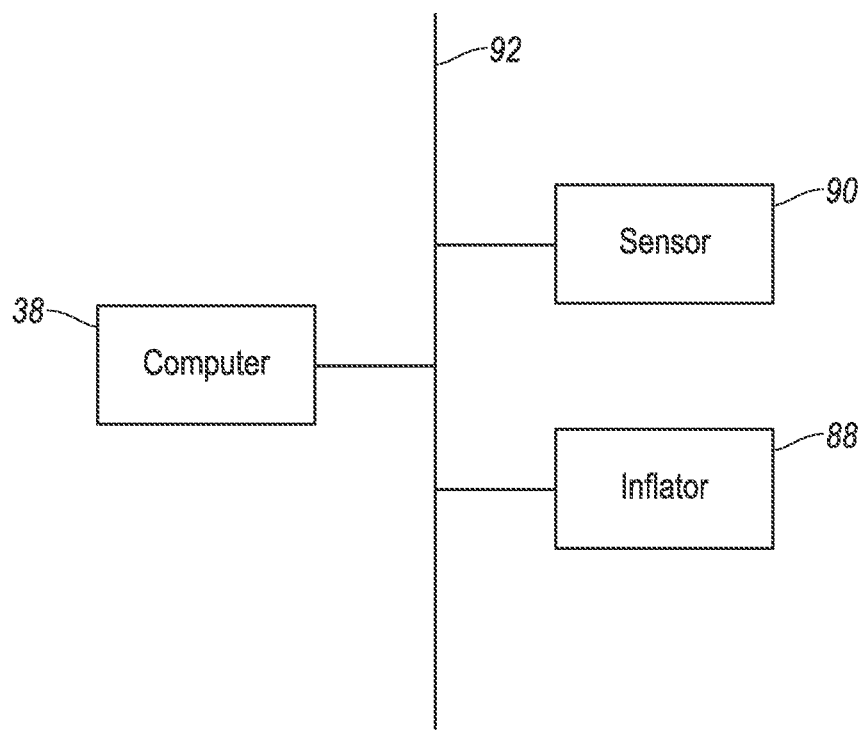
FIG. 5 is a block diagram of components of the vehicle.

The front console 24 is disposed at a forward end of the passenger cabin and extends along the cross-vehicle axis between the right side 42 and the left side 40 of the vehicle 22. The front console 24 faces toward the seats 34. For example, the outer surface 26 of the front console 24 may face the seats 34. The outer surface 26 of the front console 24 may be a class-A surface, i.e., a surface specifically manufactured to have a high quality, finished aesthetic appearance free of blemishes. The outer surface may define a curved profile transverse to the cross-vehicle axis A1. In other words, curvature of the curved profile may be defined in a plane transverse to the cross-vehicle axis A1, e.g., perpendicular to the cross-vehicle axis A1. For example, the curved profile may extend along the vehicle-vertical axis A3 and the vehicle-longitudinal axis A2. As another example, the curved profile may be defined when the front console 24 is viewed from the right side 42 or the left side 40 of the vehicle 22, as shown in FIG. 4.

The outboard ends 28 of the front console 24 are spaced along the cross-vehicle axis A1. In other words, one of the outboard ends 28 may be at the right side 42 of the vehicle 22 and the other of the outboard ends 28 may be at the left side 40 of the vehicle 22. The outboard ends 28 of the front console 24 define the center 58 of the front console 24 therebetween. The center 58 of the front console 24 is equidistant from the outboard ends 28. The center 58 of the front console 24 may be at a center of the vehicle 22 relative to the cross-vehicle axis A1. The outboard ends 28 may be outboard of the centers 58 of the seats 34 relative to the cross-vehicle axis A1. In other words, the center 58 of the seat 34 may be between the center 30 of the front console 24 and one of the outboard ends 28.

The front console 24 may include vehicle controls, including an instrument cluster, the user interface 36, etc. In another example, the front console 24 may include storage space or have other functions. In other examples, the front console 24 may include no instruments, i.e., may be a bulkhead, wall, etc.

The front console 24 may include a crossbeam 62. The crossbeam 62 may be a part of a frame of the vehicle 22 or may be connected to the frame of the vehicle 22. The crossbeam 62 may provide lateral structural support for the vehicle 22. The crossbeam 62 may extend laterally, i.e., along the cross-vehicle axis A1, fully across the passenger cabin. Other components, such as the vehicle controls, the airbag 32, etc., may be supported by the crossbeam 62. The crossbeam 62 may have a tubular shape with, e.g., a rectangular or square cross-section. The crossbeam 62 may be steel, aluminum, etc.

The front console 24 may include a plurality of support arms 64. The support arms 64 support the airbag 32. For example, the support arms 64 may be fixed to a housing 66 supporting the airbag 32. The support arms 64 may extend from the crossbeam 62 to the housing 66. The support arms 64 may extend radially from the crossbeam 62 relative to the cross-vehicle axis A1. The support arms 64 may be fixed to the crossbeam 62.

The user interface 36 presents information to and receives information from an occupant of the vehicle 22. The user interface 36 may include dials, digital readouts, screens such as a touch-sensitive display screen, speakers, and so on for providing information to the occupant, e.g., human-machine interface (HMI) elements. The user interface 36 may include buttons, knobs, keypads, microphone, and so on for receiving information from the occupant. The user interface 36 is supported by the front console 24. The user interface 36 may be elongated along the cross-vehicle axis A1. The user interface 36 faces the seat 34. The user interface 36 may extend along the front console 24 in front of the first seat 34 and/or the second seat 34. For example, the user interface 36 may extend from the center 30 of the front console 24 to in front of, and beyond, the center 58 of the seat 34. As another example, the user interface 36 may extend along the front console 24 from outboard of the center 58 of one of the seats 34 to outboard of the center 58 of another of the seats 34.

Figure 2:
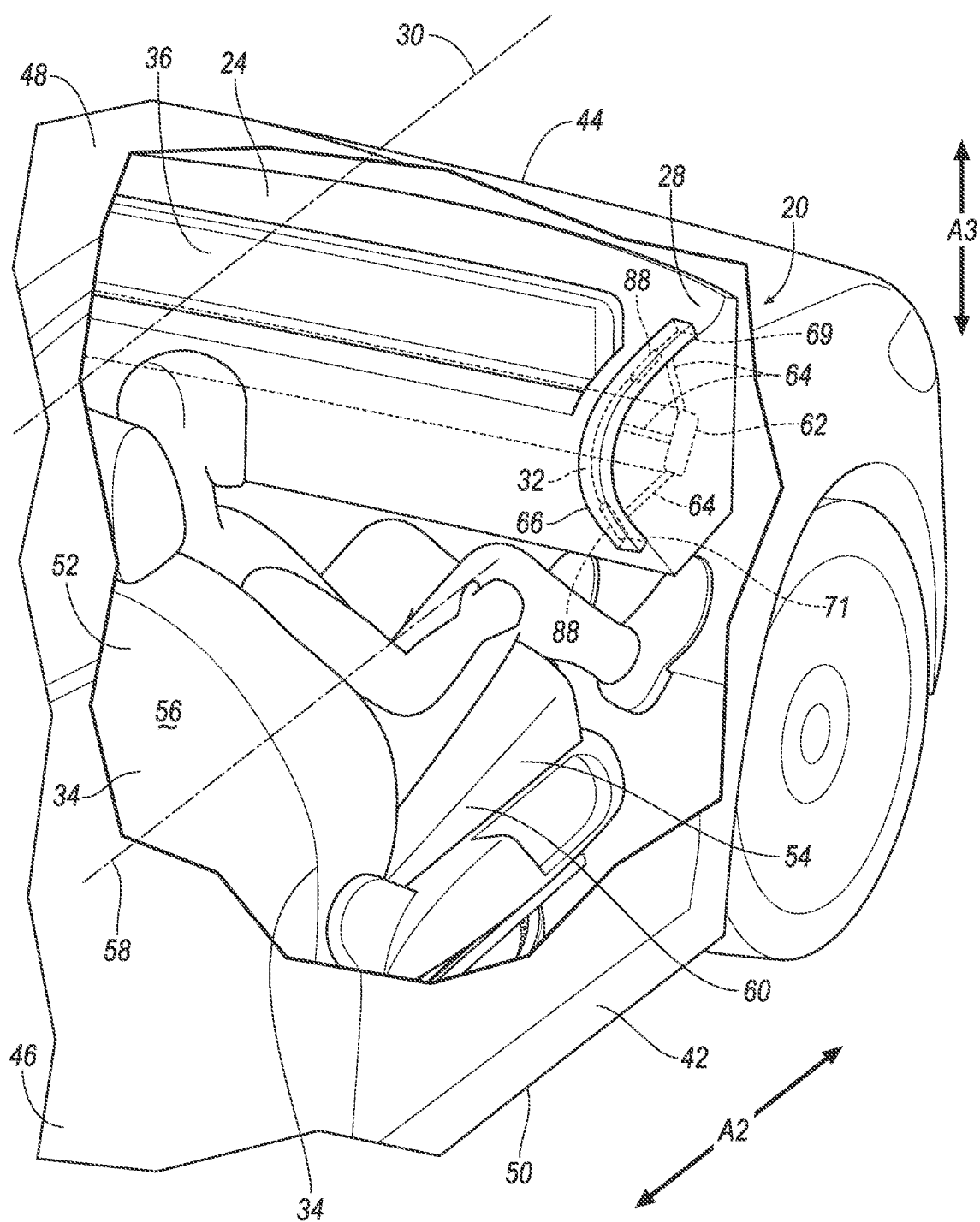
FIG. 2 is a perspective view of the vehicle including the airbag assembly.
Figure 3:
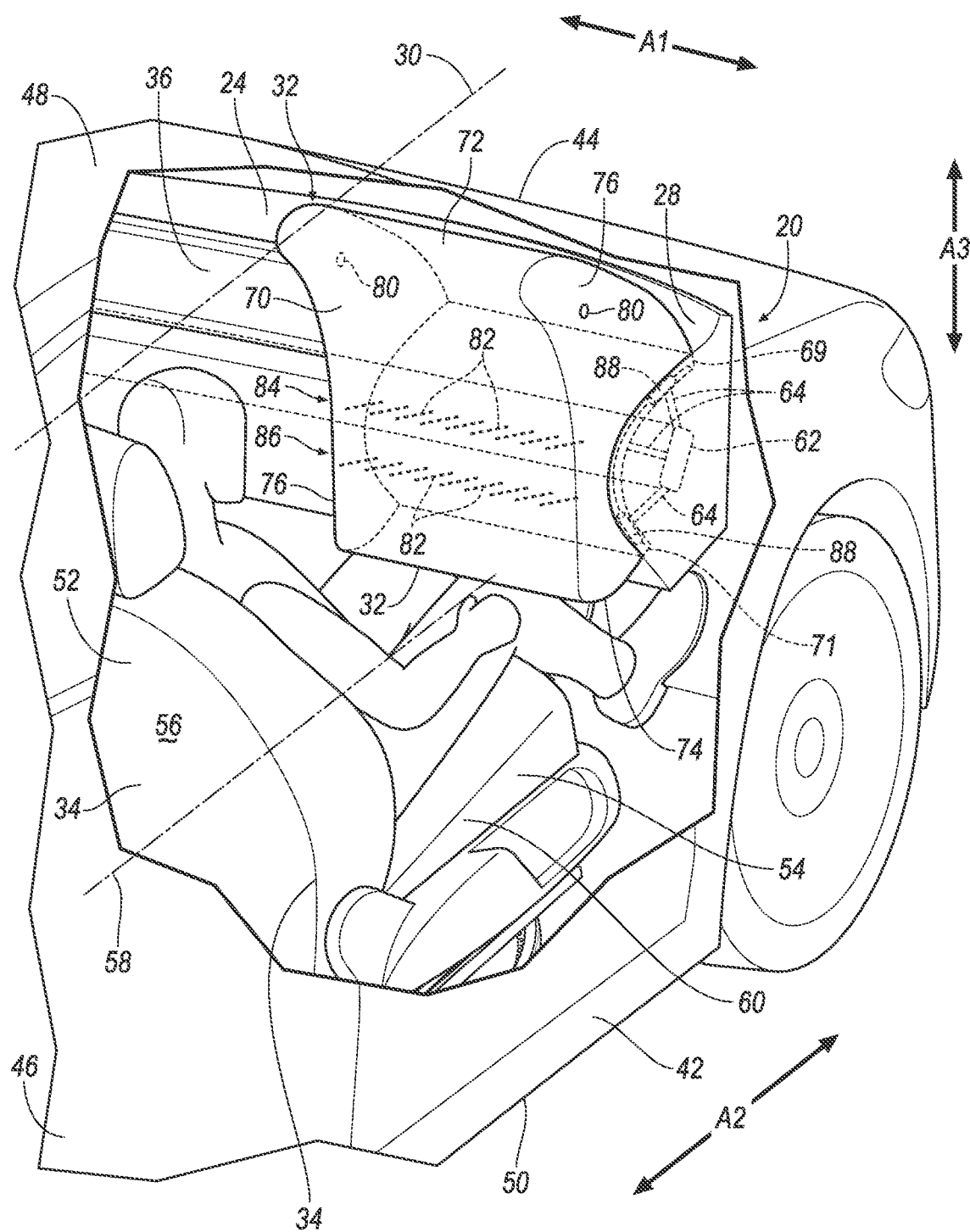
FIG. 3 is a perspective view of the vehicle including the airbag assembly and having an inflated airbag.

The housing 66 houses the airbag 32 in an uninflated position, shown in FIGS. 1 and 2, and supports the airbag 32 in the inflated position, shown in FIGS. 3 and 4. The airbag 32 may be rolled and/or folded to fit within the housing 66 in the uninflated position. The housing 66 may be of any suitable material, e.g., a rigid polymer, a metal, a composite, or a combination of rigid materials.

The housing 66 is supported by the front console 24. For example, the housing 66 may be fixed to the support arms 64. The housing 66 is supported by the front console 24 at one of the outboard ends 28, e.g., at the right side 42 of the vehicle 22 or the left side 40 of the vehicle 22. In other words, the housing 66 is outboard of the center 58 of the seat 34 relative to the cross-vehicle axis A1. For example, the housing 66 may be spaced from the center 58 of the seat 34, and be between the center 58 of the seat 34 and the right side 42 or left side 40 of the vehicle 22 relative to the cross-vehicle axis A1. As another example, the housing 66 may be outboard of the user interface 36, i.e., between the user interface 36 and the right side 42 or left side 40 of the vehicle 22 relative to the cross-vehicle axis A1. The housing 66 is elongated transverse to the cross-vehicle axis A1. For example, the housing 66 may be elongated along the vehicle-vertical axis A3 and the vehicle-longitudinal axis A2.

The airbag 32 may be formed of a woven polymer or any other material. As one example, the airbag 32 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

Airbags 32 may be supported by the front console 24 at each of the outboard ends 28, e.g., by the housing 66. The airbag 32 is inflatable from the uninflated position, shown in FIGS. 1 and 2, to the inflated position, shown in FIGS. 3 and 4. The airbag 32 in the uninflated position is elongated transverse to the cross-vehicle axis A1, e.g., within the housing 66. The airbag 32 in the uninflated position is elongated between a first end 69 and a second end 71. The first end 69 may be above the second end 71 relative to the vehicle-vertical axis A3. The airbag 32 in the uninflated position is curved, e.g., within the housing 66 between the first end 69 and the second end 71. For example, the airbag 32 in the uninflated position may be curved in a plane transverse to the cross-vehicle axis A1, e.g., perpendicular to the cross-vehicle axis A1. As another example, the curve of the airbag 32 in the uninflated position may extend along the vehicle-vertical axis A3 and the vehicle-longitudinal axis A2. As another example, the curve of the airbag 32 in the uninflated position may be defined when the front console 24 is viewed from the right side 42 or the left side 40 of the vehicle 22. The curve of the airbag 32 in the uninflated position may be complimentary to the curved profile of the outer surface 26 of the front console 24. The airbag 32 in the uninflated position is outboard of the user interface 36. For example, the airbag 32 in the uninflated position may be between the user interface 36 and the right side 42 or left side 40 of the vehicle 22 relative to the cross-vehicle axis A1.

The airbag 32 in the uninflated position may be packaged into the housing 66 by first folding and/or rolling the airbag 32 parallel to the cross-vehicle axis A1 and then folding and/or rolling the airbag 32 parallel to the vehicle-longitudinal axis A2. Folding and/or rolling the airbag 32 in such manner enables the airbag 32 to inflate to the inflated position by first unfolding and/or unrolling to expand along the cross-vehicle A1, i.e., outboard to inboard. Then the airbag 32 unfolds and/or unrolls to expand along the vehicle-longitudinal axis A2 and vehicle-vertical axis A3, e.g., rearward, upward, and downward.

The airbag 32 in the inflated position may include a front panel 68, a rear panel 70, a top panel 72, a bottom panel 74, and a pair of side panels 76. The panels 68, 70, 72, 74 may define an inflation chamber 78 of the airbag 32. The top panel 72 may be spaced from and above the bottom panel 74 along the vehicle-vertical axis A3. The side panels 76 may be spaced from each other along the cross-vehicle axis A1. The front panel 68 may be spaced from and in front of the rear panel 70 along the vehicle-longitudinal axis A2. The two or more of the panels 68, 70, 72, 74 may be fixed to each other, e.g., at a seam with stitching, adhesive, friction welding, etc. Two or more of the panels 68, 70, 72, 74 may be monolithic, i.e., a one-piece unit without any fasteners, joints, welding, adhesives, etc., fixing the panels 68, 70, 72, 74 to each other.

The airbag 32 in the inflated position extends along the outer surface 26 of the front console 24 toward the center 30 of the front console 24. For example, the airbag 32 may extend away from the housing 66 toward the center 30 of the front console 24 and along the cross-vehicle axis A1 with the front panel 68 abutting the outer surface 26 of the front console 24 and the user interface 36. The front panel 68 may define a curved profile that conforms to the curved profile of the outer surface 26 of the front console 24. For example, curvature of the curved profile of the front panel 68 may be defined in a plane transverse to the cross-vehicle axis A1, e.g., perpendicular to the cross-vehicle axis A1. For example, the curved profile of the front panel 68 may extend along the vehicle-vertical axis A3 and the vehicle-longitudinal axis A2. As another example, the curved profile of the front panel 68 may be defined when the front console 24 is viewed from the right side 42 or the left side 40 of the vehicle 22, as shown in FIG. 4.

The airbag 32 in the inflated position may abut the seatback 52. For example, the rear panel 70 of the airbag 32 may abut the rear surface 56 of the seatback 52 when the seat 34 is facing the rear 46 of the vehicle 22. The airbag 32 in the inflated position abutting the rear surface 56 of the seatback 52 controls kinematics of the seat 34, e.g., during an impact to the vehicle 22.

The top panel 72 may extend away from the front console 24 perpendicular to the cross-vehicle axis A1 further than the bottom panel 74. For example, the top panel 72 may extend toward the rear 46 of the vehicle 22, toward the seat 34, etc., further than the bottom panel 74. In other words the top panel 72 may extend toward the rear 46 of the vehicle 22 beyond the bottom panel 74.

The rear panel 70 of the airbag 32 is spaced from the front console 24, e.g., along the vehicle-longitudinal axis A2. The rear panel 70 may curve away from the front console 24, e.g., as the rear panel 70 extends from the bottom panel 74 to the top panel 72. In other words, the rear panel 70 may curve toward the rear 46 of the vehicle 22, toward the seat 34, etc., as the as the rear panel 70 extends from the bottom panel 74 to the top panel 72.

Each of the side panels 76 may include a vent 80. The vents 80 permit a controlled amount of fluid to exit the inflation chamber 78. The vents 80 may be openings in the side panels 76. The vents 80 may include a flap or other structure to open or close the vent 80, e.g., a tether and tether release, etc.

The airbag 32 in the inflated position may include tethers 82. The tethers 82 control the shape of the airbag 32 in the inflated position. The tethers 82 may extend from the front panel 68 to the rear panel 70. The tethers 82 may be fixed to the front panel 68 and the rear panel 70. The tethers 82 may be grouped into a first plurality 84 of tethers 82. The first plurality 84 of tethers 82 may be spaced along the cross-vehicle axis A1. The tethers 82 may be grouped into a second plurality 86 of tethers 82 spaced along the cross-vehicle axis A1. The second plurality 86 of tethers 82 may be below the first plurality 84 of tethers 82. In other words, the tethers 82 may be arranged in rows 84, 86 extending along the cross-vehicle axis A1 and spaced from each other along the vehicle-vertical axis A3.

The airbag assembly 20 includes one or more inflators 88 for inflating the airbag 32 from the uninflated position to the inflated position. The inflators 88 may be in fluid communication with the airbag 32, e.g., via tubing or other structure to transfer inflation medium from the inflator 88 to the airbag 32. Upon receiving an instruction, such as an electrical pulse, from, e.g., the computer 38, the inflators 88 may inflate the airbag 32 with an inflatable medium, such as a gas, to the inflated position. Each inflator 88 may be, for example, a pyrotechnic inflator 88 that uses a chemical reaction to drive inflation medium to the airbag 32. The inflators 88 may be of any suitable type, for example, a cold-gas inflator. One inflator 88 may be at the first end 69 of the airbag 32 in the uninflated position and another inflator 88 may be at the second end 71 of the airbag 32 in the uninflated position. The inflators 88 may be supported by the housing 66 or at any other suitable vehicle location. The first plurality 84 of tethers 82 and the second plurality 86 of tethers 82 may be between the first inflator 88 and the second inflator 88, e.g., relative to the vehicle-vertical axis A3.

The vehicle 22 and/or airbag assembly 20 includes an impact sensor 90 programmed to detect an impact to the vehicle 22. The impact sensor 90 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 90 may be located at numerous points in or on the vehicle 22.

The computer 38 may be a microprocessor-based computer implemented via circuits, chips, or other electronic components. For example, the computer 38 may include a processor, memory, etc. The memory of the computer 38 may include memory storing instructions executable by the processor to perform the functions described herein, as well as for electronically storing data and/or databases.

The vehicle 22 and/or airbag assembly 20 may include a communication network 92. The communication network 92 includes hardware, such as a communication bus, for facilitating communication among components such as the computer 38, the impact sensor 90, the inflators 88, etc. The communication network 92 may facilitate wired or wireless communication among the components in accordance with a number of communication protocols such as controller area network (CAN), Ethernet, WiFi, Local Interconnect Network (LIN), and/or other wired or wireless mechanisms.

In the event of an impact, the impact sensor 90 may detect the impact and transmit a signal through the communication network 92 to the computer 38. The computer 38 may transmit a signal through the communication network 92 the inflators 88. The inflators 88 may discharge and inflate the airbag 32 in response to receiving the signal.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
a front console having an outer surface and a pair of outboard ends spaced along an axis and defining a center therebetween; and
an airbag supported by the front console at one of the outboard ends and inflatable from an uninflated position elongated transverse to the axis to an inflated position extending along the outer surface toward the center.

2. The assembly of claim 1, further comprising a housing supported by the front console closer to one of the outboard ends than to the center, the housing supporting the airbag.

3. The assembly of claim 2, wherein the housing is longer along at least one of a vertical axis and a longitudinal axis than along the axis, the vertical axis and the longitudinal axis perpendicular to the axis.

4. The assembly of claim 2, wherein the front console includes a crossbeam and a plurality of support arms fixed to the housing and the crossbeam.

5. The assembly of claim 4, wherein the plurality of support arms extend radially from the crossbeam to the housing.

6. The assembly of claim 2, wherein the airbag in the inflated position extends from the housing toward the center farther than the airbag in the inflated position extends from the housing away from the center.

7. The assembly of claim 1, further comprising a first inflator in fluid communication with the airbag, and a second inflator in fluid communication with the airbag, the first inflator spaced from the second inflator along a vertical axis that is perpendicular to the axis.

8. The assembly of claim 1, further comprising a seat defining a seat center along the axis, the seat center between the center of the front console and one of the outboard ends along the axis, the airbag in the uninflated position spaced from and outboard of the seat center along the axis.

9. The assembly of claim 8, wherein the airbag in the inflated position extends along the axis from one of the outboard ends towards the center beyond the seat center.

10. The assembly of claim 1, wherein the airbag in the inflated position includes a top panel and a bottom panel, the top panel extending away from the front console perpendicular to the axis further than the bottom panel.

11. The assembly of claim 1, wherein the outer surface of the front console is a class-A surface, and the airbag in the inflated position includes a panel that abuts the class-A surface.

12. The assembly of claim 1, wherein the outer surface defines a curved profile transverse to the axis, and the airbag in the inflated position includes a panel that defines a profile that conforms to the curved profile.

13. The assembly of claim 1, further comprising a user interface supported by the front console spaced from the center along the axis, the airbag in the uninflated position is outboard of the user interface.

14. The assembly of claim 13, further comprising a seat, the user interface in front of and overlapping a center of the seat along the axis, and the airbag in the inflated position abutting the user interface.

15. The assembly of claim 1, further comprising a first seat and a second seat spaced along the axis, and a user interface extending along the front console at least from a first center of the first seat to a second center of the second seat, the airbag in the uninflated position outboard of the user interface along the axis.

16. The assembly of claim 1, further comprising a first inflator and a second inflator, and wherein the airbag in the inflated position includes a plurality of tethers spaced along the axis, the first inflator spaced from the second inflator along a vertical axis that is perpendicular to the axis, the plurality of tethers between the first inflator and the second inflator along the vertical axis.

17. The assembly of claim 16, wherein the airbag in the inflated position includes a second plurality of tethers spaced along the axis and below the plurality of tethers.

18. The assembly of claim 1, wherein the airbag in the inflated position includes a pair of panels spaced along the axis, each panel including a vent.

19. The assembly of claim 1, wherein the airbag in the uninflated position is curved.

20. The assembly of claim 1, wherein the airbag in the uninflated position is longer along at least one of a vertical axis and a longitudinal axis than along the axis, the vertical and longitudinal axis perpendicular to the axis.

* * * * *